March 25, 1958 H. F. MALONE 2,828,385
HEAVY DUTY CIRCUIT BREAKER AND BIMETAL
THERMOSTATIC UNIT THEREFOR
Filed Jan. 20, 1955

INVENTOR.
Homer F. Malone
BY
ATTORNEYS

United States Patent Office 2,828,385
Patented Mar. 25, 1958

2,828,385

HEAVY DUTY CIRCUIT BREAKER AND BIMETAL THERMOSTATIC UNIT THEREFOR

Homer F. Malone, Millburn, N. J., assignor to The Wilcolator Company, Elizabeth, N. J., a corporation of Delaware Application January 20, 1955, Serial No. 482,973

10 Claims. (Cl. 200—113)

My invention relates to improvements in circuit breakers including a novel bimetallic snap-acting unit, more particularly for ordnance equipment, such as tanks, guns and other ordnance vehicles.

Bimetal units or elements have been used as current interrupters or circuit breakers, more particularly where relatively small currents are involved, but attempts to use bimetal blades in ordnance equipment as a circuit breaker for protecting equipment presents special problems. For example, a short circuit may overheat the blade to such an extent that its protective characteristics may be altered, or it may be actually destroyed if its power is insufficient to break the contact welding that may occur under short circuit conditions. While under normal conditions the ordnance equipment referred to may utilize only 24 volt D. C. current at about fifteen amperes, there is always the possibility of a short circuit of up to 1,000 amperes, which must be interrupted by a satisfactory circuit breaker.

The primary object of the invention is to provide a heavy duty circuit breaker which withstands the severe shocks and service of ordnance equipment.

In accordance with the present invention, the improved circuit breaker comprises a support or casing structure provided with a pair of electrical terminals by which the circuit breaker is connected into the electrical circuit of an ordnance vehicle, a snap-acting bimetal unit mounted on the support and comprising a sheet or body of bimetallic material having a bowed formation and a cut-out central section, a tongue of bimetallic sheet material, one end of which is fixed to the sheet or body at one side of the cut-out section. In this construction the unit is fixedly mounted on the support only by means of the other end portion of the tongue which at the same time is electrically connected to one of said terminals, the high and low expanding sides of the tongue being oriented the same as those of the sheet of bimetallic material and the tongue extending from its point of attachment to the sheet toward the opposite side of the cut-out portion, an electrical contact fixed on one side of the bimetallic sheet adjacent the end portion of the tongue fixed to the support, and a fixed contact carried by the support engaged by the contact on the bimetallic sheet and electrically connected to the other terminal of the circuit breaker.

The improved composite snap-acting bimetal unit it of such a character that when it is mounted in its casing with all other component parts in proper relationship, and it is then subjected to a flow of electrical current, it will increase its contact pressure more and more until, when the value of the current reaches an amount sufficient to cause circuit rupture, it pushes against the fixed contact to open with a quick, decisive snap action.

In a preferred construction, the snap-acting bimetallic unit is preferably elongated and rounded at one end, particularly the end to which the tongue is fixed. Preferably the cut-out or opening extends lengthwise of the body of the unit, leaving side legs of the same width, these legs being drawn and stressed toward each other at the end of the unit opposite that to which the tongue is fixed.

According to an important feature of the invention, the tongue overlaps the surface of and is riveted or otherwise fixed to one end portion of the body of the unit so that it extends generally between the side legs, that is, through the space between the legs, the tongue being slightly narrower than the width of the space to permit the free snapping action of the unit. Furthermore, the tongue has a cross-sectional area at least equal to the sum of the cross-sectional areas of the two legs. This construction has an advantage over other types of bimetal circuit breakers in that all parts of the blade operate at the same temperature and thus no part of the blade overheats when called upon to interrupt excessively high currents. Another advantage of this construction is that it has such great strength that it operates with an unusually high contact pressure. This produces low contact resistance drop in voltage which results in a lower operating temperature of the contacts and longer life under severe service conditions.

The invention includes other features, objects and advantages described more in detail hereinafter in connection with the accompanying drawings, in which.

Figure 1:
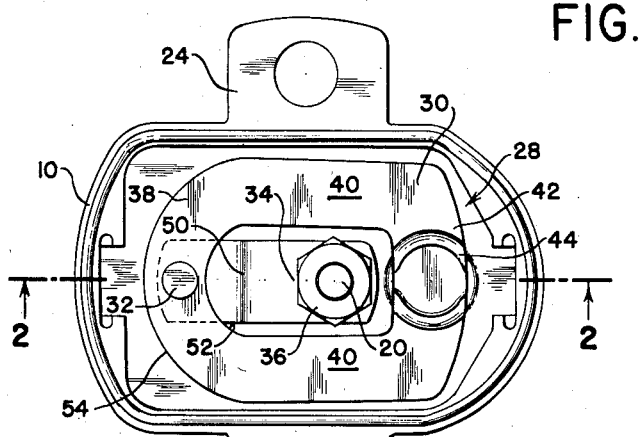
Fig. 1 is a plan view of one form of circuit breaker and bimetallic thermostatic unit constructed in accordance with the invention.
Figure 4:
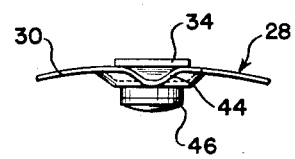
Figure 2:
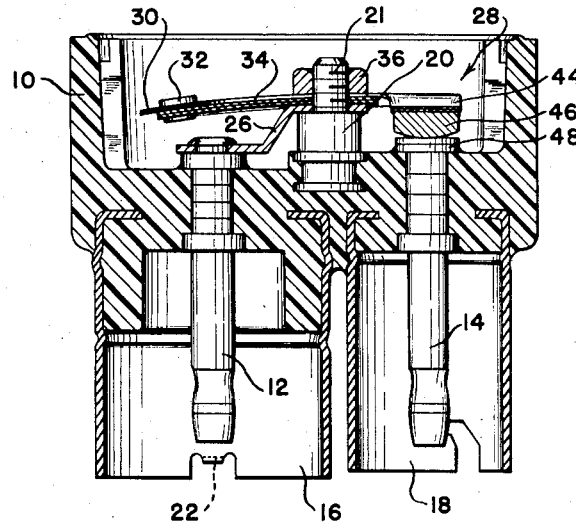
Fig. 2 is a vertical sectional view taken on the line 2—2 of Fig. 1, showing the longitudinal bowed formation or shape of the bimetallic thermostatic unit with the circuit breaker switch in closed position.
Figure 5:
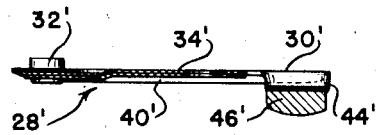
Figure 3:
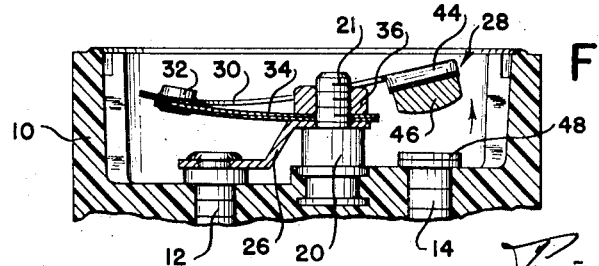
Fig. 3 is a view similar to that of Fig. 2 showing the bimetallic unit snapped to open circuit position.

Fig. 4 is a front elevational view of the bimetallic unit alone, removed from the casing, showing the cross bowed formation or structure characteristic of two forms of bimetallic unit; and Fig. 5 is a vertical longitudinal central sectional view of the second form of bimetallic unit, which has a cylindrical cross bowed formation similar to the bowed formation or deformation illustrated in Fig. 4 but which does not have a longitudinal bow, such as that provided in the bimetallic unit shown in Figs. 1 and 2.

Referring to the drawings, Figs. 1 to 4 show the form of ordnance circuit breaker which has been supplied to a branch of the armed services in considerable numbers during this year. This improved circuit breaker comprises a casing 10 of molded "Bakelite" into which electrical terminals 12 and 14, attachment sleeves 16 and 18 and a mounting stud 20 are cast during the molding operation. The terminals 12 and 14 are used for connecting the circuit breaker into the circuit to be protected, the sleeves 16 and 18 respectively receiving insulated single lead connectors which are held in place by a bayonet joint, as in the case of the sleeve 18 or by outwardly bent tabs, such as the tab 22 for the sleeve 16. The casing is provided with integral ears 24 by which the circuit breaker is bolted under the dashboard or other part of the ordnance equipment.

A relatively heavy wide metal jumper plate 26 is riveted to the top of the terminal 12 and extends upwardly and over the threaded portion 21 of the stud 20. The improved bimetal unit of the present invention is shown at 28 and is fixed to or suspended on the stud 20. The bimetallic unit comprises a sheet or body portion 30 of bimetallic material having the outline shape shown in Fig. 1. This body portion 30 is riveted by means of a rivet 32 to one end of a bimetallic tongue 34 having a hole in its opposite end fitting over the threaded portion 21 of the stud 20. The bimetallic unit is held in fixed position in the casing with one end of the tongue 34 clamped against the upper surface of the jumper plate 26 by means of a nut 36 screwed down on the threaded portion 21 of the stud 20.

The sheet or body 30 has a rounded end portion 38 to which the tongue 34 is riveted and a pair of similar legs 40 extending therefrom and connected at their other end by an end web section 42 which is provided with a deep downwardly-projecting sloping circular-shaped crimp 44, which draws and holds the adjacent ends of the legs 40 closer together, thereby causing a bowed concave deformation and stress in the sheet or body 30.

The crimp 44 has a flat bottom, to the lower surface of which is electrically spot welded an electrical contact 46, which normally engages a cooperating electric contact 48 spot welded to the upper end of the terminal 14. Fig. 2 of the drawings shows the relative vertical relationships of the parts of the circuit breaker, and it will be apparent that when the tongue 34 is clamped down by the nut 36, considerable pressure is applied between the contacts 46 and 48 by the spring action of the bimetallic unit 28. The tongue 34 is shown as including a reverse bend at 50 sufficient to bring the attachment end of the tongue into approximate alignment with the inside edges of the legs 40 or slightly above, in view of the fact that the opposite end of the tongue is riveted on the under surface of the body or sheet 30. Fig. 4 shows the position of the right hand end of the tongue 34 when the bimetallic unit is removed from the casing. The tongue 34, however, may be perfectly straight, except that the end held by the rivet 32 has the concave curvature of the underside of the sheet or body 30. These parts are overlapped and joined together by hot upset riveting or by other means such as welding so that sufficient engagement surfaces are provided for conducting the heavy currents which are encountered in ordnance vehicles.

In the construction illustrated in the drawings, the tongue 34 has a cross-sectional area equal to the sum of the cross-sectional areas of the legs 40, so that it will readily conduct the current carried by the legs 40 without being permanently distorted or even destroyed. In constructing the bimetal unit, for example, the sheet or body portion 30 may be blanked from a bimetal sheet material having a thickness of 0.015 inch, while the tongue 34 may be made from bimetal sheet material having a thickness of 0.023 inch. These relative thicknesses taken in connection with the relative widths of the tongue 34 and the legs 40 provide a construction in which the full current carried by both legs 40 is readily carried by the tongue 34.

It has been found from experience that the sheet or body 30 preferably has the inside and outside rounded end portion 38 of approximately the same width as that of the legs 40 because this construction contributes to a much more uniform operation than where these portions of the unit are merely cut square as might be the case in the cutting of the blanks from larger sheets of bimetal.

In the formation of the improved bimetallic unit, the sheet 30, after it has been cut out, is preferably subjected to at least two forming operations, in the first of which the legs 40 are deformed by a punch press operation. In making a particular ordnance blade having a length of 1.281 inches and a width of 0.937 inch, the punch had a radius of curvature of 1.250 inches and covered the legs uniformly. The legs 40 were turned inwardly or downwardly by the punch press operation, as shown in Fig. 4, with the high expanding side of the bimetal being the lower or concave side. The blade or sheet 30 was then subjected to a second forming operation to bow the rounded portion 38 which includes the parts bordered by the inside and outside circular edges 52 and 54. This was accomplished by means of a punch press, the punch of which has a radius of curvature of 0.937 and was set concentric to the arcs 52 and 54. This operation produced a spherical concave formation or deformation on the high expanding side, which is illustrated in Fig. 2 of the drawings.

In the unit having the dimensions given above, the arcs 52 and 54 have radii of 0.234" and 0.484", the legs 40 are 0.437" apart, the opening is 0.749" long and the tongue is 0.312" wide and 0.881" long.

The concave appearance of the sheet 30, as illustrated in Fig. 4 of the drawings, is caused by deforming legs 40 of the blade unit in the manner described above, to provide a concave spherical formation having a center at about the position of the end of the lead line from the reference numeral 34 in Fig. 1. The concave appearance shown in Fig. 2 may also be caused to some extent by the formation of the crimp 44. However, as illustrated in Fig. 5, a modified form of blade or sheet 30' may have a substantially straight longitudinal cylindrical formation, with a transverse curvature about the same as that shown in Fig. 4. The elements of the blade unit 28' of Fig. 5, corresponding to those of the unit 28 are indicated by the same numbers with a prime.

The circuit breaker with either form of bimetal blade unit, that is, with the spherical deformation or cylindrical deformation operates in about the same manner, it being understood that the high expanding metal of the bimetal is on the under or concave side of the unit, that is, it expands more rapidly than the upper or low expanding side when heated. Assuming, for example, that in Figs. 1 and 2 the terminals 12 and 14 are connected into an electric circuit of an ordnance vehicle so that an electrical current flows, the resultant heating of the bimetal elements of the unit 28 causes the riveted end of the tongue 34 to rise and, by the resultant leverage action, causes the contact 46 to increase its pressure against the contact 48. Finally, when the sheet 30 is heated to a certain predetermined temperature, it snaps into a reverse curvature and the contact 46 is lifted entirely free of the contact 48, as in Fig. 3, thereby breaking the circuit through the terminals 12 and 14. As soon as the bimetal unit 28 cools down slightly, it snaps back to its closed position.

The cylindrical type of bowed construction as distinguished from the spherical concave or bowed construction provides a form of bimetal unit which is adapted to provide for temperature elevation or for a considerable temperature differential.

The improved circuit breaker and bimetal unit of the present invention are particularly adapted for heavy duty ordnance work and in the particular dimensions given for use with 24 volt current D. C. Because of the possibility of a highly elevated level of thermal response of the circuit breaker, it is well adapted to operation in high ambient temperature situations such as engine compartments. It is equally well adapted to protection of electrical components under overload conditions at extremely low temperature exposure, such as —60° F., under any ambient temperature between and including, these extremes. The circuit breaker is capable of interrupting short circuit currents of as much as 1000 or more amperes at 28 volts D. C., and of recycling automatically for several hours without allowing more than a safe value of effective current to flow in the circuit.

I claim:

1. An ordnance circuit breaker comprising a casing provided with a pair of electrical terminals, a fixed electrical contact electrically connected to one of said terminals, a snap-acting bimetallic unit mounted in said casing including a sheet bimetal body having end portions connected by similar spaced legs, a bimetal tongue formed of a section of sheet material separate from said bimetal body, said tongue extending generally lengthwise between said legs and having one end overlapping and fastened to one end portion of the body, the other end of the tongue being fixedly secured in said casing in electrical connection with the other terminal and constituting the means by which the bimetallic unit is mounted in the casing, said tongue being electrically conductive and being of greater thickness than said bimetal body, and an electrical contact carried by the other end portion of the sheet bimetal body normally engaging the fixed contact connected to one of said terminals.

2. An ordnance circuit breaker as claimed in claim 1, in which the bimetallic unit is concave on its high expanding side, the contact carried by the body facing in the direction of the high expanding side of the tongue.

3. An ordnance circuit breaker as claimed in claim 1, in which the sheet bimetal body has a spherical deformation extending across its legs and is concave on its high expanding side.

4. An ordnance circuit breaker as claimed in claim 1, in which the end portion of the body to which the tongue is fixed is rounded uniformly so that it has a width about the same as that of one of the legs.

5. A snap-acting bimetallic unit including a sheet bimetal body having end portions connected by similar spaced parallel legs, a bimetal tongue formed of a section of sheet material separate from said bimetal body, said tongue extending generally lengthwise between and about parallel to said legs and having one end overlapping and fastened to one end portion of the bimetal body, the other end of the tongue being provided with means for fixedly securing the unit on a mounting, said tongue being electrically conductive and being of greater thickness than said bimetal body and an electrical contact carried by the other end portion of the sheet bimetal body on the side of the high expanding side of the tongue.

6. An ordnance circuit breaker comprising a casing provided with a pair of electrical terminals, a fixed electrical contact electrically connected to one of said terminals, a snap-acting bimetallic unit mounted in said casing including a sheet bimetal body having end portions connected by similar spaced legs, a bimetal tongue of sheet material extending generally lengthwise between said legs and having one end overlapping and fixed to one end portion of the body, the other end of the tongue being fixedly secured in said casing in electrical connection with the other terminal and constituting the means by which the bimetallic unit is mounted in the casing, said tongue having a cross sectional area as great as the combined cross sectional areas as the legs of the bimetallic body, and an electrical contact carried by the other end portion of the sheet bimetallic body normally increasing the fixed contact connected to one of said terminals.

7. An ordnance circuit breaker as claimed in claim 6, including means for biasing the ends of the legs toward each other at the end of the body adjacent the said other end of the tongue, whereby the body is deformed.

8. A snap-acting bimetallic unit including a sheet bimetal body having end portions connected by similar spaced parallel legs, a bimetal tongue of sheet material extending generally lengthwise between and about parallel to said legs and having one end overlapping and fixed to one end portion of the bimetal body, the other end of the tongue being provided with means for fixedly securing the unit on a mounting, and an electrical contact carried by the other end portion of the sheet bimetal body on the side of the high expanding side of the tongue, the high and low expanding sides of the tongue and body being oriented the same, and the tongue having a cross sectional area at least as great as the combined cross sectional areas of both legs.

9. A snap-acting bimetallic unit including a sheet bimetal body having end portions connected by similar spaced parallel legs, a bimetal tongue of sheet material extending generally lengthwise between and about parallel to said legs and having one end overlapping and fixed to one end portion of the bimetal body, the other end of the tongue being provided with means for fixedly securing the unit on a mounting, an electrical contact carried by the other end portion of the sheet bimetal body on the side of the high expanding side of the tongue, the bimetal body being generally concave on its high expanding side, and means for biasing the ends of the legs toward each other at the end of the body opposite that to which the tongue is fixed.

10. A snap-acting bimetallic unit including a sheet bimetal body having end portions connected by similar spaced parallel legs, a bimetal tongue of sheet material extending generally lengthwise between and about parallel to said legs and having one end overlapping and fixed to one end portion of the bimetal body, the other end of the tongue being provided with means for fixedly securing the unit on a mounting, and an electrical contact carried by the other end portion of the sheet bimetal body on the side of the high expanding side of the tongue, the end portion of the body adjacent the said other end of the tongue being crimped toward the high expanding side of the body, said contact being fixed to said crimp.

References Cited in the file of this patent

UNITED STATES PATENTS

| 2,182,048 | Elmer | Dec. 5, 1939 |
| 2,266,537 | Elmer | Dec. 16, 1941 |
| 2,707,216 | Farison | Apr. 26, 1955 |

FOREIGN PATENTS

| 560,434 | Great Britain | Apr. 4, 1944 |
| 657,434 | Great Britain | Sept. 19, 1951 |